US008611705B2

(12) United States Patent
Kautzsch

(10) Patent No.: US 8,611,705 B2
(45) Date of Patent: Dec. 17, 2013

(54) SILICON OPTICAL SWITCH DEVICES

(75) Inventor: Thoralf Kautzsch, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 149 days.

(21) Appl. No.: 13/286,567

(22) Filed: Nov. 1, 2011

(65) Prior Publication Data

US 2013/0108213 A1    May 2, 2013

(51) Int. Cl.
 *G02B 6/26* (2006.01)
(52) U.S. Cl.
 USPC .................... 385/16; 385/15; 385/23; 385/57
(58) Field of Classification Search
 USPC .................................... 385/14–16, 32, 23, 57
 See application file for complete search history.

(56) References Cited

U.S. PATENT DOCUMENTS

| | | | | |
|---|---|---|---|---|
| 6,388,359 | B1 * | 5/2002 | Duelli et al. | 310/309 |
| 6,591,037 | B2 * | 7/2003 | Yonekubo | 385/32 |
| 6,816,295 | B2 * | 11/2004 | Hong et al. | 359/227 |
| 6,839,479 | B2 * | 1/2005 | Berger et al. | 385/16 |
| 7,054,519 | B1 * | 5/2006 | Novotny | 385/16 |
| 2011/0068420 | A1 | 3/2011 | Binder | |

OTHER PUBLICATIONS

Figure from "Practical MEMS: Design of microsystems, accelerometers, gyroscopes, RF MEMS, optical MEMS, and microfluidic systems", by Ville Kaajakari , ISBN-10: 0982299109 | ISBN-13: 978-0982299104 | Publication Date: Mar. 17, 2009.
Rauschenbeutel, *Glasfasern dünner als Licht*, Dated Jan. 2009, pp. 19-21.
Wu et al., *Optical MEMS for Lightwave Communication*, Journal of Lightwave Technology, vol. 24, No. 12, Dec. 2006, pp. 4433-4454.
Wu et al., "Optical MEMS for Lightwave Communication", Journal of Lighwave Technology, vol. 24, No. 12, Dec. 2006, pp. 4433-4454.
Johnsen et al., "A Simple Demonstration of Frustrated Total Internal Reflection", Am. J. Phys., vol. 76, No. 8, Mar. 10, 2008, pp. 746-749.
Rauschenbeutel, "Glasfasern dünner als Licht", Jan. 2009, pp. 19-21.

* cited by examiner

*Primary Examiner* — Ellen Kim
(74) *Attorney, Agent, or Firm* — Patterson Thuente Pedersen, P.A.

(57) ABSTRACT

Embodiments relate to optical switching devices. In embodiments, the optical switching devices are implemented in a silicon substrate and comprise an absorbent element selectively movable into and out of the evanescent field of a light beam which passes through a lamella. The absorbent element attenuates the evanescent part of the light beam such that the beam can be switched on and off by movement of the absorbent element.

21 Claims, 1 Drawing Sheet

SILICON OPTICAL SWITCH DEVICES

TECHNICAL FIELD

The invention relates generally to optical switches and more particularly to silicon optical switch devices that operate by attenuating an evanescent component of a light beam.

BACKGROUND

Optical networks rely on switches, modulators and data selectors in order to reliably distribute signals via extensive and ramified systems. Electrical switches, associated with conversion of the optical signal into an electrical signal and reconversion, require a not-inconsiderable amount of electronic hardware and are furthermore coupled with an appreciable power consumption. For switching optical data lines, micromechanical structures have been used for some time and enable signals to be distributed at a purely optical level. Modulation frequencies of about 1 Mb/s initially were achieved thereby, with these frequencies since increased through structural improvements.

Conventional optical switches typically use a simple data line with a shutter that interrupts the optical path, or a moveable mirror that either reflects a beam to a connection piece of an optical waveguide or projects the beam onto an optically inactive area. These switches generally comprise micromechanical systems that modulate the light beam by capacitive deflection of a moveable structure. Another conventional approach is a micromechanical interference filter used as an optical switch.

These conventional solutions suffer from drawbacks. Most are structurally complex and therefore expensive to manufacture. Some, such as the shutter approach, have disadvantageous structural requirements, such as a movable part that covers a distance of about 10 µm or more in order to operate reliably. In the case of interference filters, such structures are difficult to integrate well into an application-specific integrated circuit (ASIC) or peripheral electronics.

Therefore, there is a need for improved optical switching devices.

SUMMARY

Embodiments relate to optical switching devices. In an embodiment, an optical switching device comprises a silicon layer; and an optical switch formed in the silicon layer and comprising a lamella portion and a movable element, the lamella portion configured to guide a light wave and the movable element configured to selectively move toward the lamella portion to attenuate the light wave.

In an embodiment, a method comprises inputting an optical signal to an optical switching device comprising a light-guiding lamella and a movable element formed in a silicon substrate; and selectively switching the optical switching device by causing the movable element to move closer to the light-guiding lamella to attenuate the optical signal.

In an embodiment, an optical switching device comprises a silicon substrate; an optical switch formed in the silicon layer and comprising a lamella portion and a movable element, the lamella portion configured to guide a light wave and the movable element configured to selectively move toward the lamella portion to attenuate the light wave; and an integrated circuit formed in the silicon substrate.

BRIEF DESCRIPTION OF THE DRAWINGS

The invention may be more completely understood in consideration of the following detailed description of various embodiments of the invention in connection with the accompanying drawings, in which.

Figure 1:
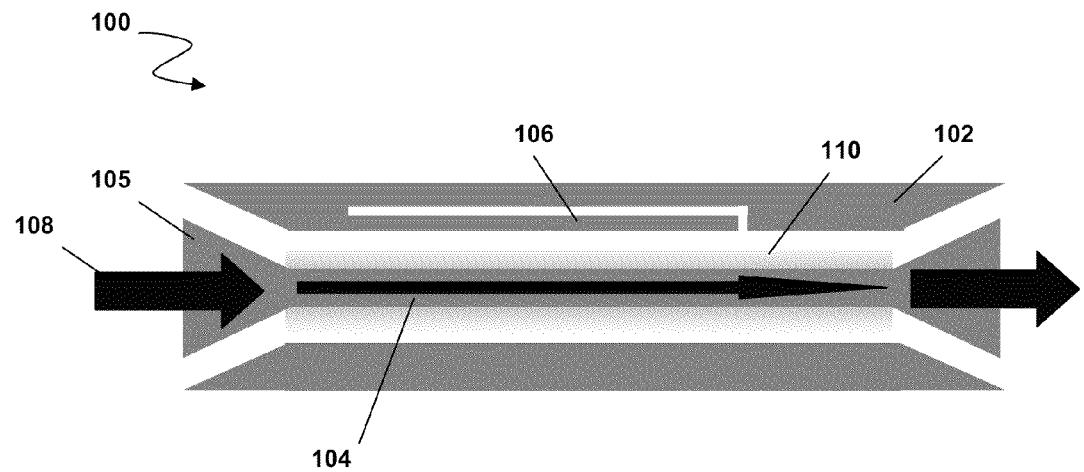
FIG. 1 is a block diagram of an optical switching device according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to optical switching devices. In embodiments, the optical switching devices are implemented in a silicon substrate and comprise an absorbent element selectively movable into and out of the evanescent field of a light beam which passes through a lamella. The absorbent element attenuates the evanescent part of the light beam such that the beam can be switched on and off by movement of the absorbent element.

Referring to FIG. 1, an embodiment of an optical switching device 100 is depicted. Switching device 100 is formed in a silicon substrate or layer 102 and comprises a light-guiding lamella 104 and a movable element 106. Lamella 104 is a portion of an overall optical fiber 105.

Lamella 104 functions as a very thin optical fiber, a portion of fiber 105, for transmitting a light wave 108, such as an infrared or other suitable light signal, and, in embodiments, has a thickness on the order of the wavelength of light beam or wave 108. Lamella 104 and fiber 105 can comprise weakly or undoped silicon, silicon oxide and/or nitride, among other suitable materials, in embodiments. Light wave 108 thus can pass through lamella 104 with virtually no losses as long as there are no absorbent materials in lamella 104 or in the vicinity thereof.

Figure 2:
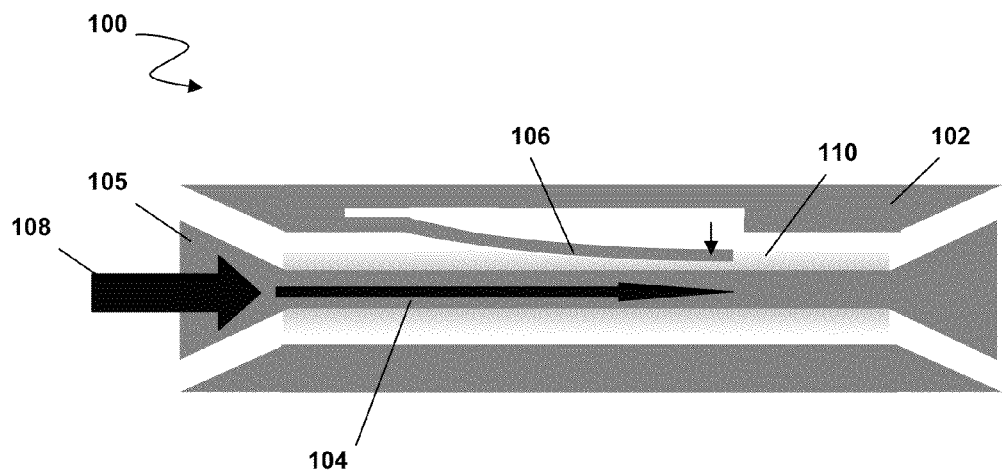
FIG. 2 is a block diagram of an optical switching device according to an embodiment.

If a second lamella or suitable absorbent body, such as movable element 106, is brought into the vicinity of the path of light wave 108 as depicted in FIG. 2, however, light wave 108 is attenuated. Movable element 106 comprises silicon, such as highly doped silicon, and, with lamella 104, can form a capacitor. Application of a suitable voltage can manipulate movable element 106 such that element 106 moves closer to lamella 104, as in FIG. 2, and therefore into an evanescent portion 110 of light wave 108, or further away from lamella 104 and evanescent portion 110, as in FIG. 1. Movement of element 106 into evanescent portion 110 attenuates evanescent portion 110, which is sufficiently pronounced in embodiments that no intensity of light wave 108 emerges at the output of device 100. Thus, the movement of movable element 106 to attenuate evanescent portion 110 of light beam 108 causes device 100 to function as an optical switch.

Device 100 can be formed in silicon 102 using a trench etch and/or other suitable manufacturing techniques. Embodiments of device 100 can be single-element switches, such as is depicted in FIG. 1, or a series or array of devices 100 can be formed. Further, embodiments can be integrated with one or more integrated circuits, such as an ASIC or other device, in the same substrate.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An optical switching device comprising:
a silicon layer; and an optical switch formed in the silicon layer and comprising a lamella portion and a movable element, the lamella portion comprising a section of an optical fiber and being configured to guide a light wave and the movable element configured to selectively move toward the lamella portion to attenuate the light wave.

2. The optical switching device of claim 1, wherein movable element is configured to selectively move toward the lamella and into an evanescent portion of the light wave.

3. The optical switching device of claim 1, wherein the lamella portion comprises silicon having a higher doping than silicon of the optical fiber.

4. The optical switching device of claim 3, wherein a dimension of the lamella portion is on the order of a wavelength of the light wave.

5. The optical switching device of claim 1, wherein the movable element and the lamella portion comprise a capacitor.

6. The optical switching device of claim 5, wherein the movable element is configured to selectively move toward or away from the lamella portion according to an applied voltage.

7. The optical switching device of claim 1, wherein the light wave comprises infrared light.

8. The optical switching device of claim 1, further comprising an integrated circuit formed in the silicon layer.

9. The optical switching device of claim 1, wherein the lamella portion comprises at least one of silicon, silicon oxide or nitride.

10. A method comprising: inputting an optical signal to an optical switching device comprising a light-guiding lamella and a movable element formed in a silicon substrate, wherein the light-guiding lamella comprises a portion of an optical fiber; and selectively switching the optical switching device by causing the movable element to move closer to the light-guiding lamella to attenuate the optical signal.

11. The method of claim 10, wherein selectively switching further comprises applying a voltage to the optical switching device to influence a capacitor formed by the light-guiding lamella and the movable element.

12. The method of claim 10, wherein inputting an optical signal comprises inputting an infrared signal.

13. The method of claim 10, wherein selectively switching further comprises causing the movable element to move closer to the light-guiding lamella and into an evanescent portion of the optical signal to attenuate the optical signal.

14. The method of claim 10, further comprising forming the optical switching device by etching the lamella and the movable element in the silicon substrate.

15. The method of claim 14, further comprising forming the optical switching device by etching the lamella and the movable element in the silicon substrate using a trench etch process.

16. The method of claim 10, further comprising integrating the optical switching device with an integrated circuit formed on the silicon substrate.

17. An optical switching device comprising:
a silicon substrate; an optical switch formed in the silicon layer and comprising a lamella portion and a movable element, the lamella portion comprising a portion of an optical fiber and being configured to guide a light wave, and the movable element configured to selectively move toward the lamella portion to attenuate the light wave; and an integrated circuit formed in the silicon substrate.

18. The optical switching device of claim 17, wherein movable element is configured to selectively move toward the lamella and into an evanescent portion of the light wave.

19. The optical switching device of claim 17, wherein the movable element and the lamella portion comprise a capacitor.

20. The optical switching device of claim 19, wherein the movable element is configured to selectively move toward or away from the lamella portion according to an applied voltage.

21. The optical switching device of claim 17, wherein the lamella portion comprise at least one of silicon, silicon oxide or nitride.

* * * * *